(12) United States Patent
Ravich et al.

(10) Patent No.: US 11,507,441 B2
(45) Date of Patent: Nov. 22, 2022

(54) ASYMMETRIC FULFILLMENT OF REMOTE PROCEDURE CALLS BY MULTI-CORE SYSTEMS

(71) Applicant: EMC IP Holding Company LLC, Hopkinton, MA (US)

(72) Inventors: Leonid Ravich, Yatzitz (IL); Yuri Chernyavsky, Petach Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 27 days.

(21) Appl. No.: 17/154,179

(22) Filed: Jan. 21, 2021

(65) Prior Publication Data

US 2022/0229711 A1 Jul. 21, 2022

(51) Int. Cl.
| | |
|---|---|
| *G06F 3/00* | (2006.01) |
| *G06F 9/54* | (2006.01) |
| *G06F 15/173* | (2006.01) |
| *G06F 9/50* | (2006.01) |

(52) U.S. Cl.
CPC ............ *G06F 9/547* (2013.01); *G06F 9/5016* (2013.01); *G06F 9/544* (2013.01); *G06F 9/546* (2013.01); *G06F 15/17331* (2013.01)

(58) Field of Classification Search
CPC ........ G06F 9/547; G06F 9/5016; G06F 9/544; G06F 9/546; G06F 15/17331
See application file for complete search history.

(56) References Cited

U.S. PATENT DOCUMENTS

| | | | |
|---|---|---|---|
| 10,812,584 B2 | 10/2020 | Yang et al. | |
| 10,983,930 B1 | 4/2021 | Ravich et al. | |
| 2014/0281243 A1* | 9/2014 | Shalf | G06F 12/0842 |
| | | | 711/122 |
| 2015/0277974 A1* | 10/2015 | Beale | G06F 9/5088 |
| | | | 714/19 |
| 2018/0293188 A1* | 10/2018 | Katayama | G06F 13/1663 |
| 2019/0230161 A1* | 7/2019 | Romem | G06F 16/30 |
| 2021/0058459 A1 | 2/2021 | Faibish et al. | |

OTHER PUBLICATIONS

Alkalay, Amitai, et al.; "Partitioning a Cache for Fulfilling Storage Commands," U.S. Appl. No. 17/077,149, filed Oct. 22, 2020.

(Continued)

*Primary Examiner* — Andy Ho
*Assistant Examiner* — Abdou K Seye
(74) *Attorney, Agent, or Firm* — BainwoodHuang

(57) ABSTRACT

A method of performing a remotely-initiated procedure on a computing device is provided. The method includes (a) receiving, by memory of the computing device, a request from a remote device via remote direct memory access (RDMA); (b) in response to receiving the request, assigning processing of the request to one core of a plurality of processing cores of the computing device, wherein assigning includes the one core receiving a completion signal from a shared completion queue (Shared CQ) of the computing device, the Shared CQ being shared between the plurality of cores; and (c) in response to assigning, performing, by the one core, a procedure described by the request. An apparatus, system, and computer program product for performing a similar method are also provided.

12 Claims, 7 Drawing Sheets

(56) References Cited

OTHER PUBLICATIONS

Shveidel, Vladimir, et al.; "RPC-Less Locking Mechanism Based on RDMA CAW for Storage Cluster With Active-Active Architecture," U.S. Appl. No. 17/145,625, filed Jan. 11, 2021.
"RDMA Aware Networks Programming User Manual" Rev. 1.7; 2015; accessed from https://www.mellanox.com/related-docs/prod_software/RDMA_Aware_Programming_user_manual.pdf on Jan. 5, 2021; Mellanox Technologies; 216 pages.

\* cited by examiner

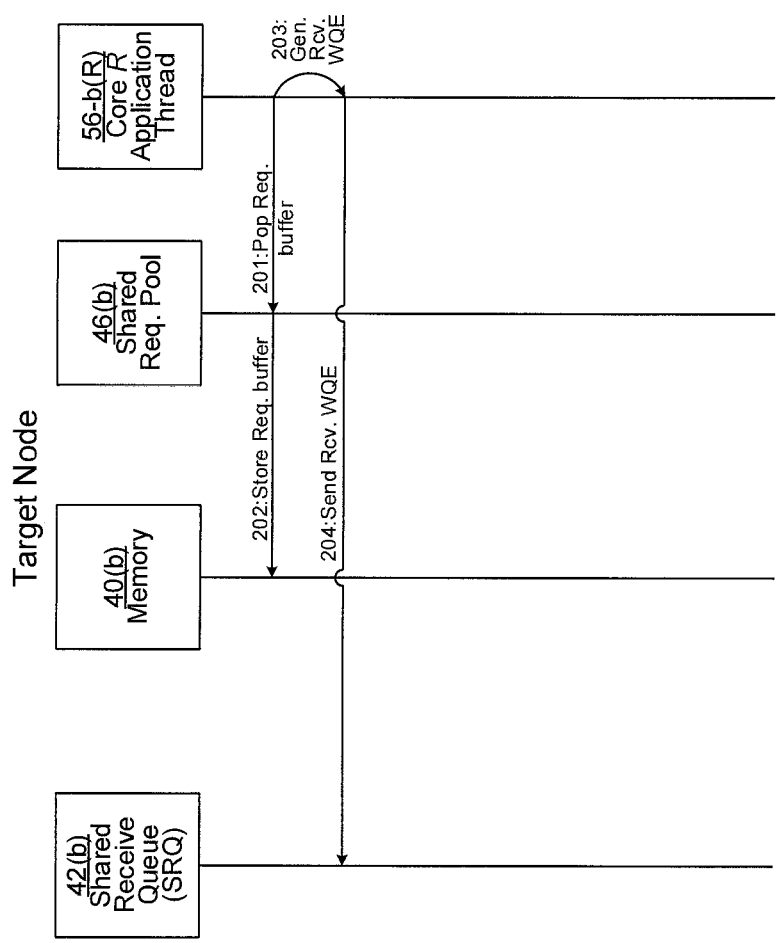

Target Node

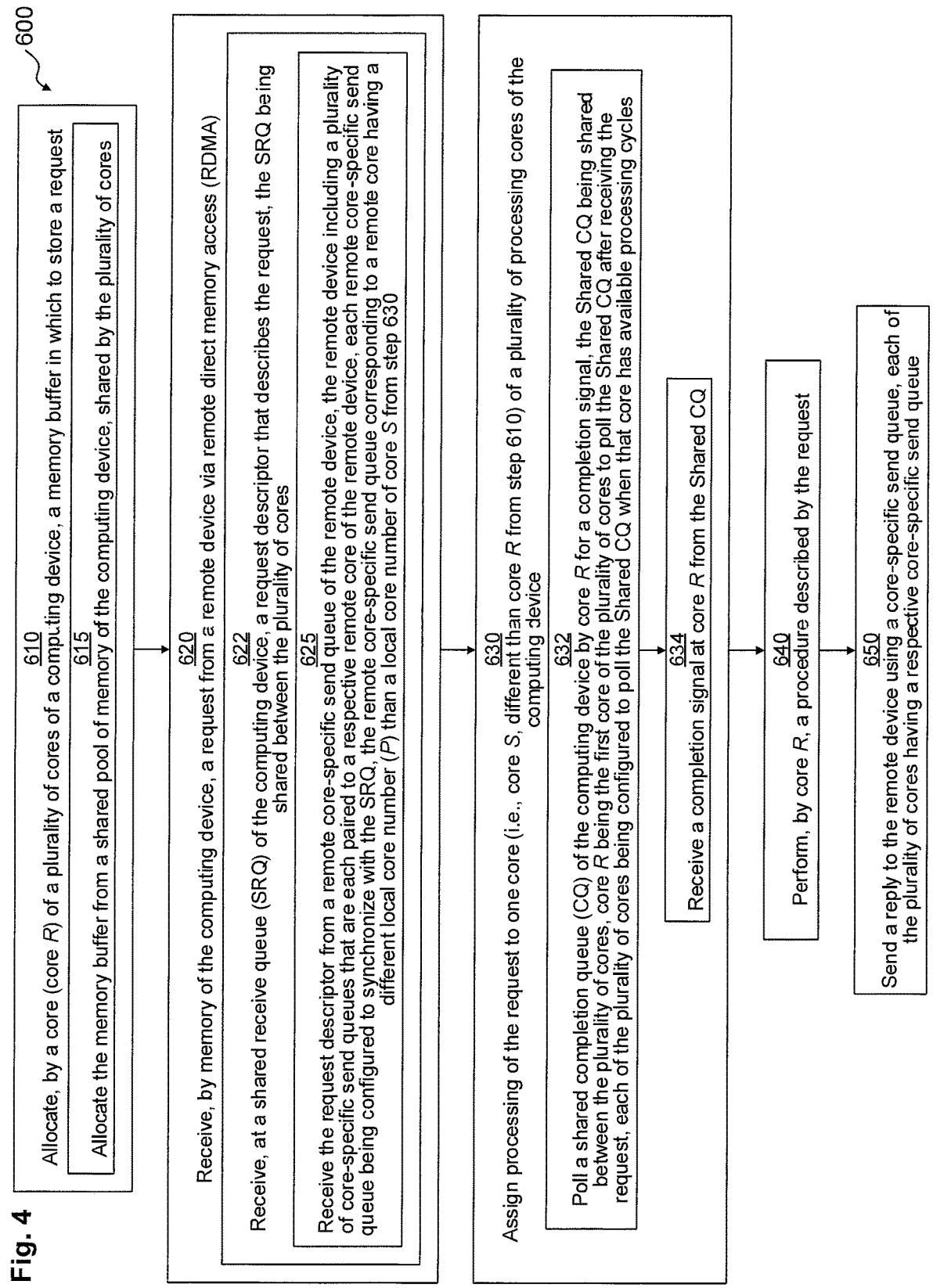

ASYMMETRIC FULFILLMENT OF REMOTE PROCEDURE CALLS BY MULTI-CORE SYSTEMS

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems communicate with one another using high-speed technologies, such as Remote Direct Memory Access (RDMA). These systems may communicate over high-speed media, such as Ethernet and InfiniBand, issuing remote procedure calls over those connections using RDMA.

SUMMARY

Some storage systems utilize multiple processing cores, with various threads running on different cores. In order to coordinate remote procedure calls over RDMA from multiple cores, these systems may use a symmetric arrangement in which a core of a first storage system issues calls directly to a corresponding (same-numbered) core of a peer storage system. This may be done by setting up queue pairs (QPs) between the corresponding cores of two systems. For example, a QP includes a send queue of a core of one device paired to a receive queue of the corresponding core of another device. The paired queues may be kept synchronized. In addition, each core maintains its own pool of send and receive buffers for sending and receiving requests over its corresponding QP.

However, the above-described symmetric arrangement is less than ideal because workload may be distributed in an inefficient way, causing increased latency. Thus, for example, even though an initiating core on one device may have sufficient processing cycles to send a request to a target device, the corresponding core on the target device may be overwhelmed with work while other cores on the target device are free.

Thus, it would be desirable to implement an asymmetric arrangement for remote procedure calls between multi-core devices using RDMA. This may be accomplished by configuring multiple per-core send queues on an initiator device to all pair to a single shared receive queue that is shared between multiple cores on a target device. The shared receive queue is associated with a single shared completion queue (Shared CQ) of the target device, the Shared CQ being configured to report completed receipt of commands by the associated shared receive queue. Upon receipt, by the target device, of a command from the initiator device, the target device assigns that command to a particular core of the target device. This assignment may be done by having cores of the target device poll the Shared CQ when they have free cycles, and assigning the command to the first core to poll the Shared CQ. In some embodiments, the per-core send queues share a pool of buffers. It should be understood that although embodiments have been described in connection with data storage systems, embodiments may also be directed to other computing devices that do not serve as data storage systems.

In one embodiment, a method of performing a remotely-initiated procedure on a computing device is provided. The method includes (a) receiving, by memory of the computing device, a request from a remote device via RDMA; (b) in response to receiving the request, assigning processing of the request to one core of a plurality of processing cores of the computing device, wherein assigning includes the one core receiving a completion signal from an Shared CQ of the computing device, the Shared CQ being shared between the plurality of cores; and (c) in response to assigning, performing, by the one core, a procedure described by the request. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIGS. 3A-3D are sequence diagrams depicting example procedures performed by various cores working in conjunction according to various embodiments.

FIG. 4 is a flowchart depicting an example procedure according to various embodiments.

DETAILED DESCRIPTION OF THE INVENTION

Embodiments are directed to techniques for implementing an asymmetric arrangement for remote procedure calls (RPCs) between multi-core devices using Remote Direct Memory Access (RDMA). This may be accomplished by configuring multiple per-core send queues on an initiator device to all pair to a single shared receive queue that is shared between multiple cores on a target device. The shared receive queue is associated with a single shared completion queue (Shared CQ) of the target device, the Shared CQ being configured to report completed receipt of commands by the associated shared receive queue. Upon receipt, by the target device, of a command from the initiator device, the target device assigns that command to a particular core of the target device. This assignment may be done by having cores of the target device poll the Shared CQ when they have free cycles, and assigning the command to the first core to poll the Shared CQ. In some embodiments, the per-core send queues share a pool of buffers.

Figure 1:
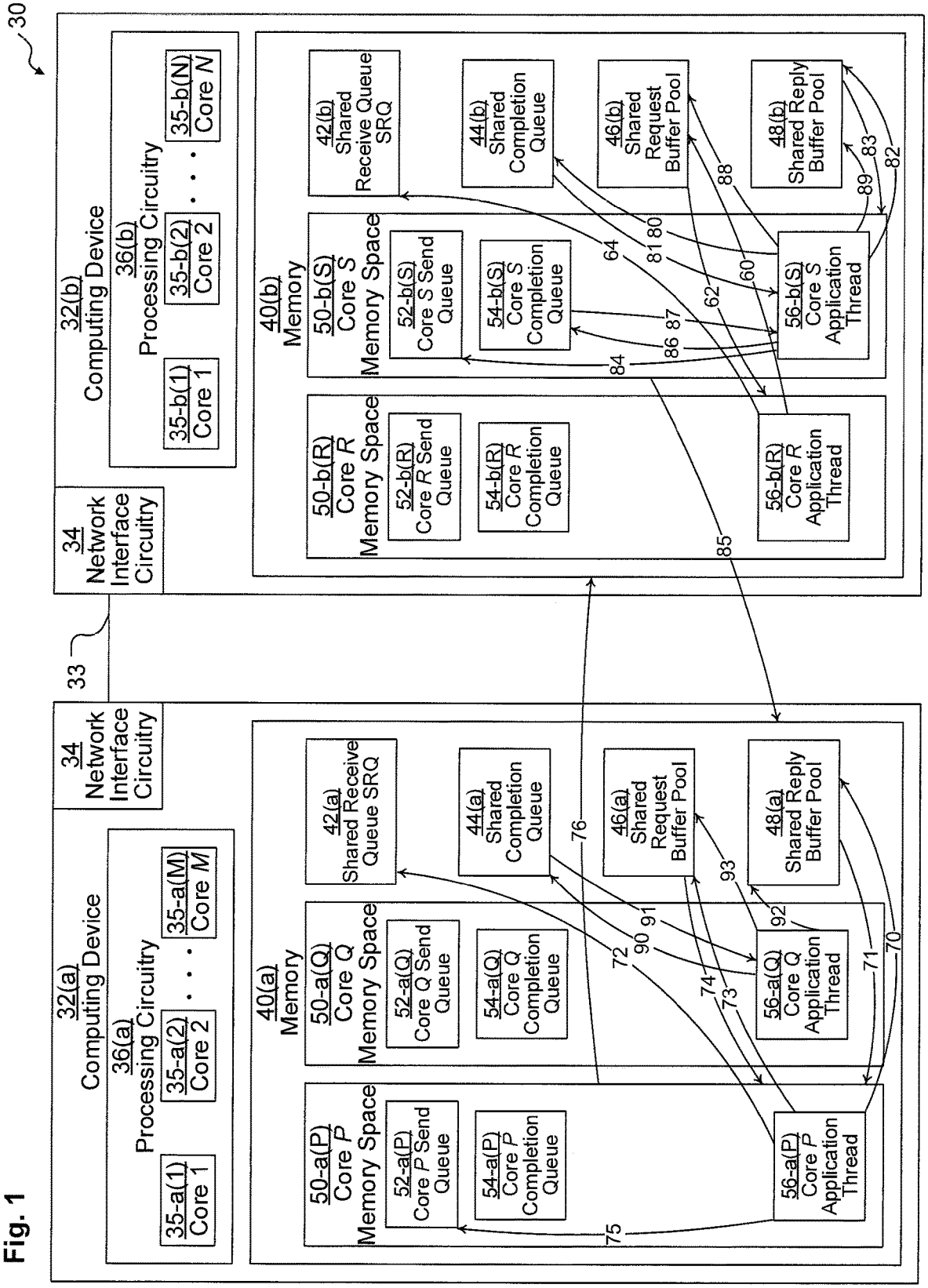
FIG. 1 is a block diagram depicting an example system, apparatus, and data structure arrangement for use in connection with various embodiments.

FIG. 1 depicts an example system 30 for use in connection with various embodiments. System 30 includes two computing devices 32 (depicted as computing devices 32(a), 32(b)). A computing device 32 may be any kind of computing device, such as, for example, a personal computer, workstation, server computer, enterprise server, data storage array device, laptop computer, tablet computer, smart phone, mobile computer, etc. In an example embodiment, a computing device 32 is a storage node of a storage system. In that example embodiment, a disk array enclosure on a single shelf of a rack may include two separate storage nodes as well as multiple storage drives connected to both storage nodes.

Each computing device 32 includes network interface circuitry 34, processing circuitry 36 (depicted as processing circuitry 36($a$), 36($b$)), and memory 40 (depicted as memory 40($a$), 40($b$)). Each computing device 32 may also include various other components that are not depicted, such as storage interface circuitry, persistent storage, caches, user interface circuitry, interconnection circuitry, etc.

Processing circuitry 36 may include any kind of multi-core processor or set of processors configured to perform operations, such as, for example, a multi-core microprocessor, a set or multiple microprocessors, etc. In one example embodiment, processing circuitry 36($a$) is a multi-core chip having M cores 35 (depicted as cores 35-$a$(1), 35-$a$(2), ..., 35-$a$(M)), and processing circuitry 36($b$) is a multi-core chip having N cores 35 (depicted as cores 35-$b$(1), 35-$b$(2), ..., 35-$b$(N)).

Network interface circuitry 34 may include one or more Ethernet cards, cellular modems, Fibre Channel (FC) adapters, InfiniBand adapters, wireless networking adapters (e.g., Wi-Fi), and/or other devices for connecting two computing devices 32($a$), 32($b$) over a network connection 33, such as, for example, a LAN, WAN, SAN, the Internet, a wireless communication network, a virtual network, a fabric of interconnected switches, a point-to-point connection, etc. Network interface circuitry 34 allows computing devices 32 to communicate over the network connection 33. In some embodiments, network interface circuitry 34 supports the RDMA over InfiniBand standard. In some embodiments, network interface circuitry 34 supports the RDMA over IP (iWARP) standard. In some embodiments, network interface circuitry 34 supports the RDMA over converged Ethernet (RoCE) standard. In some embodiments, network interface circuitry 34 supports the Nonvolatile Memory Express (NVMe) over Fabrics (NVMe-OF) communications protocol.

Memory 40 may be any kind of digital system memory, such as, for example, random access memory (RAM). Memory 40 stores an operating system (OS) (not depicted) in operation (e.g., a Linux, UNIX, Windows, MacOS, or similar operating system). Memory 40 also stores a shared receive queue (SRQ) 42, a shared completion queue (Shared CQ) 44, a shared request buffer pool 46, and a shared reply buffer pool 48, as well as a set of per-core memory spaces 50 (depicted as core P memory space 50-$a$(P) and core Q memory space 50-$a$(Q) on computing device 32($a$); and core R memory space 50-$b$(R) and core S memory space 50-$b$(S) on computing device 32($b$)). Each per-core memory space includes a core-specific send queue 52, a core-specific completion queue 54, and one or more core-specific application threads 56.

Figure 2:
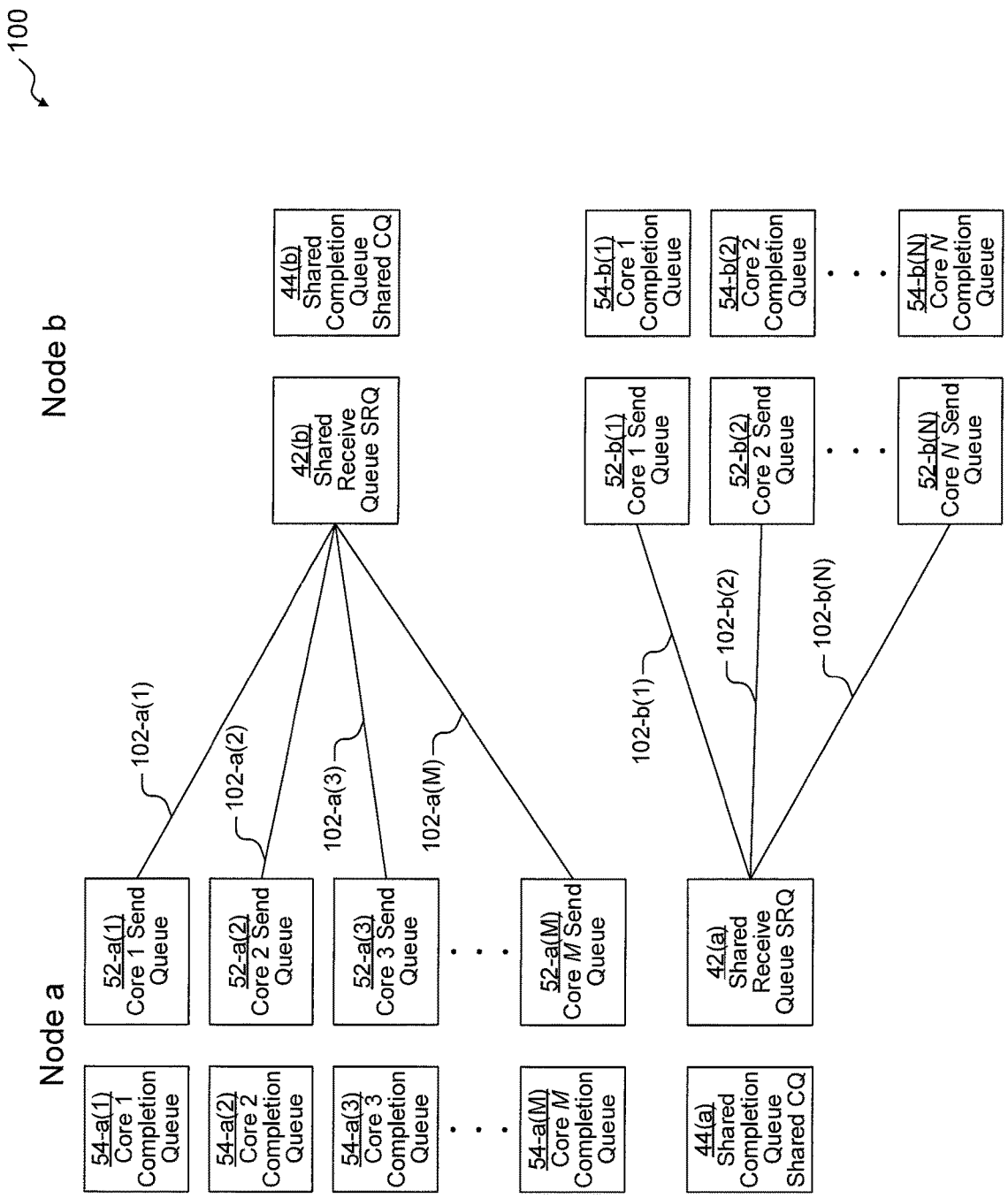
FIG. 2 is a block diagram depicting an example data structure arrangement for use in connection with various embodiments.

An example logical arrangement 100 of queues 42, 44, 52, 54 on computing devices 32($a$), 32($b$) is illustrated in FIG. 2. Computing device 32($a$) (also called node a) has M core-specific send queues 52 (depicted as core-specific send queues 52-$a$(1), 52-$a$(1), 52-$a$(3), ... 52-$a$(M)), one for each core 35-$a$(1), 35-$a$(2), ... 35-$a$(M). Each core-specific send queue 52-$a$ has an associated core-specific completion queue 54-$b$ (depicted as core-specific completion queues 54-$a$(1), 54-$a$(2), 54-$a$(3), ... 54-$a$(M)). Each core-specific send queue 52-$a$ has a pairing relationship 102 (depicted as pairing relationships 102-$a$(1), 102-$a$(2), 102-$a$(3), ... 102-$a$(M)) to a single shared receive queue SRQ 42($b$) on node b, which itself is associated with a shared completion queue Shared CQ 44($b$). SRQ 42($b$) and Shared CQ 44($b$) are both shared among all the cores 35-$b$ of node b.

Similarly, computing device 32($b$) (also called node b) has N core-specific send queues 52 (depicted as core-specific send queues 52-$b$(1), 52-$b$(1), ... 52-$a$(N)), one for each core 35-$b$(1), 35-$b$(2), ... 35-$b$(N). Each core-specific send queue 52-$b$ has an associated core-specific completion queue 54-$b$ (depicted as core-specific completion queues 54-$b$(1), 54-$b$(2), ... 54-$b$(N)). Each core-specific send queue 52-$b$ has a pairing relationship 102 (depicted as pairing relationships 102-$b$(1), 102-$b$(2), ... 102-$b$(N)) to a single shared receive queue SRQ 42($a$) on node a, which itself is associated with a shared completion queue Shared CQ 44($a$). SRQ 42($a$) and Shared CQ 44($a$) are both shared among all the cores 35-$a$ of node a.

Pairing relationships 102 are configured to synchronize changes between nodes a and b using RDMA. Thus, for example, whenever an application thread 56-$a$($x$) on node a makes a change to its respective core x send queue 52-$a$($x$), that change is automatically synchronized to the SRQ 42($b$) of node b over pairing relationship 102-$a$($x$).

It should be noted that the number of core-specific send queues 52 on each computing device 32 may differ. It should also be noted that in some embodiments, the number of core-specific send queues 52-$a$, 52-$b$ on a computing device 32($a$), 32($b$), may differ from the number M, N of cores 35 on that computing device 32($a$), 32($b$). Thus, for example, even if computing device 32($a$) has 16 cores, there may only be 10 core-specific send queues 52-$a$ on computing device 32($a$) (e.g., on cores 35-$a$(1), ..., 35-$a$(10)) which means that any core-specific application threads 56-$a$ running on cores 35-$a$(11), ..., 35-$a$(16) are not able to issue RPCs to computing device 32($b$).

Similarly, it is possible for there to be more than one SRQ 42 per computing device 32 (not depicted). For example, in one embodiment, node a has 16 cores (35-$a$(1), ..., 35-$a$(16)) and node b has 12 cores (35-$b$(1), ..., 35-$b$(12)). In addition, for example, cores 35-$a$(1), ..., 35-$a$(13) of node a have core-specific send queues 52-$a$(1), ..., 52-$a$(13), but cores 35-$a$(1), ..., 35-$a$(8) pair to a first SRQ 42($b$) of node b, and cores 35-$a$(9), ..., 35-$a$(13) pair to a different SRQ of node b (not depicted). Similarly, and as part of the same example, cores 35-$b$(2), ..., 35-$b$(11) of node b have core-specific send queues 52-$b$(2), ..., 52-$b$(11), but cores 35-$b$(2), ..., 35-$b$(6) pair to a first SRQ 42($a$) of node a, and cores 35-$a$(7), ..., 35-$a$(11) pair to a different SRQ of node a (not depicted). In this example, cores 35-$a$(14), 35-$a$(15), 35-$a$(16), 35-$b$(1), and 35-$b$(12) do not have core-specific send queues 52 or core-specific completion queues, which means that any core-specific application threads 56 running on those cores 35-$a$(14), 35-$a$(15), 35-$a$(16), 35-$b$(1), 35-$b$(12) are not able to issue RPCs to the other node.

Memory 40 may also store various other data structures used by the OS, threads 56, and various other applications and drivers. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 is configured to store programs and data even while the computing device 32 is powered off. The OS, threads 56, and various other applications and drivers are typically stored in this persistent storage portion of memory 40 so that they may be loaded into a system portion of memory 40 upon a system restart or as needed. The OS, threads 56, and various other applications and drivers, when stored in non-transitory form either in the volatile portion of memory 40 or in persistent portion of memory 40, each form a computer program product. The processing circuitry 36 running one or more applications thus forms a specialized circuit constructed and arranged to carry out the various processes described herein.

In operation, system 30 may perform a set of related methods 200, 300, 400, 500, depicted in FIGS. 3A, 3B, 3C, 3D, respectively, to allow computing device 32(*a*) to serve as an initiator node to issue RPCs to be performed by computing device 32(*b*) as a target node. It should be understood that, in some embodiments, both computing devices 32(*a*), 32(*b*) are capable of serving as both initiators and targets, but for any given RPC, either computing device 32(*a*) is the initiator and computing device 32(*b*) is the target, or computing device 32(*b*) is the initiator and computing device 32(*a*) is the target. For simplicity, only the situation in which computing device 32(*a*) is the initiator and computing device 32(*b*) is the target will be described herein.

FIG. 3A depicts an example method 200 performed by core #R (i.e., core 35-*b*(R)) of computing device 32(*b*) to set up computing device 32(*b*) to serve as a target. In step 201, Core R application thread 56-*b*(R) sends a pop command 60 to the shared request buffer pool 46(*b*) of node b to pop (step 202) a request buffer 62 from the shared request buffer pool 46(*b*). A request buffer 62 has a pre-defined size, such as, for example, 128 bytes. Then, in step 203, Core R application thread 56-*b*(R) generates a work queue element (WQE) 64 (depicted as a Receive WQE in FIG. 3A) that describes the request buffer 62 (e.g., it points to the memory address of request buffer 62) and stores (step 204) the Receive WQE 64 in the shared receive queue 42(*b*). It should be understood that method 200 may be performed over and over on any cores 35-*b* of computing device 32(*b*) that have available processing cycles in order to prepare for the arrival of RPC requests from computing device 32(*a*).

Figure 3B:
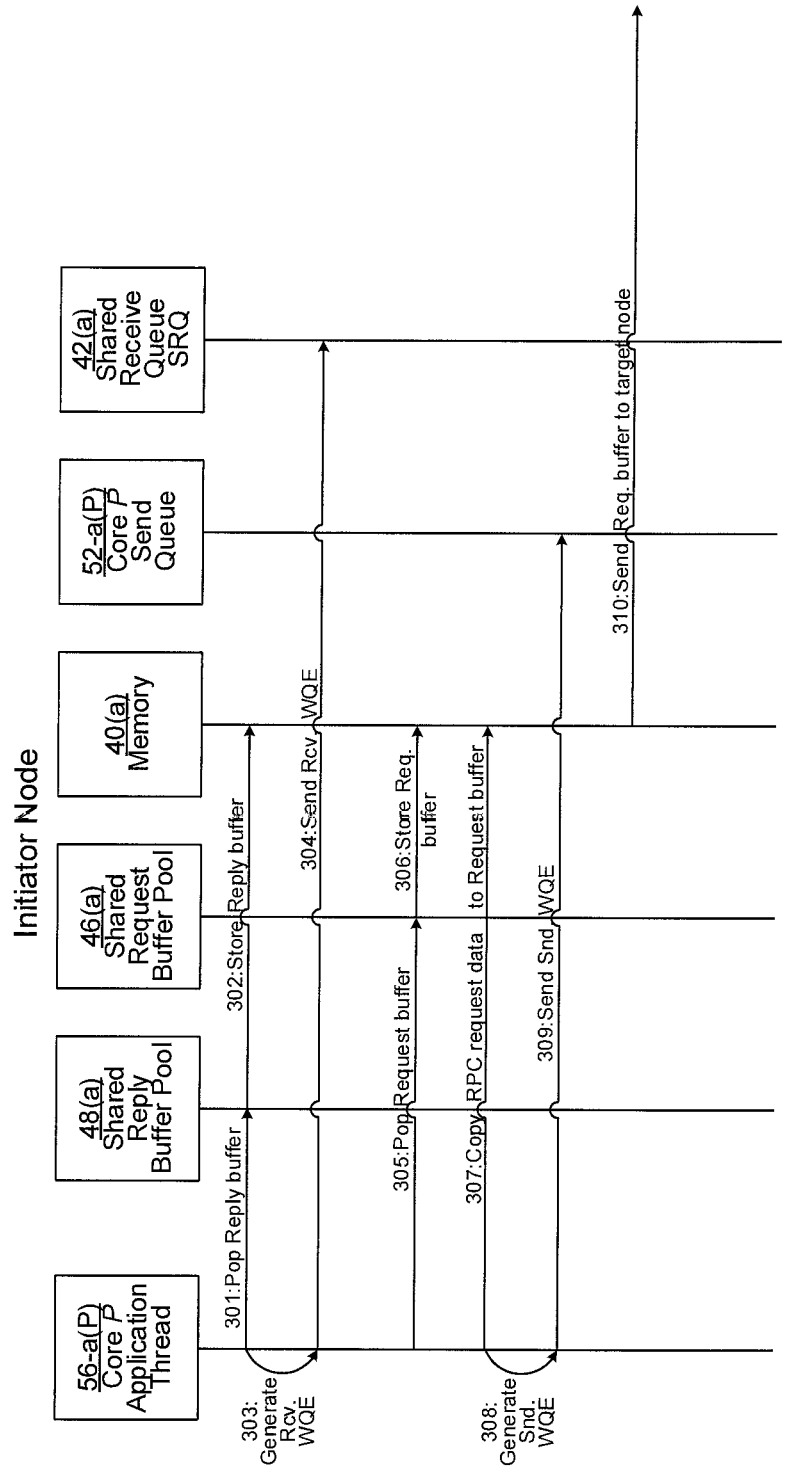

FIG. 3B depicts an example method 300 performed by core #P (i.e., core 35-*a*(P)) of computing device 32(*a*) to send an RPC request from computing device 32(*a*) as initiator to computing device 32(*b*) as a target. Core P application thread 56-*a*(P) first sets up a reply buffer 71 to eventually receive a response from computing device 32(*b*) (steps 301-304), and then it sets up a request buffer 74 to send to computing device 32(*b*) (steps 305-310).

In step 301, Core P application thread 56-*a*(P) sends a pop command 70 to the shared reply buffer pool 48(*a*) of node a to pop (step 302) a reply buffer 71 from the shared reply buffer pool 48(*a*). A reply buffer 71 has a pre-defined size, such as, for example, 512 bytes. Then, in step 303, Core P application thread 56-*a*(P) generates a work queue element (WQE) 72 (depicted as a Receive WQE in FIG. 3B) that describes the reply buffer 71 (e.g., it points to the memory address of reply buffer 71) and stores (step 304) the Receive WQE 72 in the shared receive queue 12(*a*).

In step 305, Core P application thread 56-*a*(P) sends a pop command 73 to the shared request buffer pool 46(*a*) of node a to pop (step 306) a request buffer 74 from the shared request buffer pool 46(*a*). Then, in step 307, Core P application thread 56-*a*(P) copies data of an RPC request that it wishes to issue (e.g., a command to send certain data to computing device 32(*b*)) into the request buffer 74, and in step 308, Core P application thread 56-*a*(P) generates a WQE 75 (depicted as a Send WQE in FIG. 3B) that describes the request buffer 74 (e.g., it points to the memory address of request buffer 74 and it includes a send WQE header, which may be 36 bytes in one example embodiment), storing (step 309) the Send WQE 75 in the core-specific send queue 52-*a*(P). At this point, pairing relationship 102-*a*(P) causes the core-specific send queue 52-*a*(P) to be synchronized to SRQ 42(*b*) of computing device 32(*b*) by sending the Send WQE 75 over the network connection 33 using RDMA (see step 402*a* of FIG. 3C). In addition, in step 310, computing device 32(*a*) sends the updated contents 76 of the request buffer 74 across network connection 33 using RDMA directly into memory 40(*b*) of computing device 32(*b*).

Figure 3C:
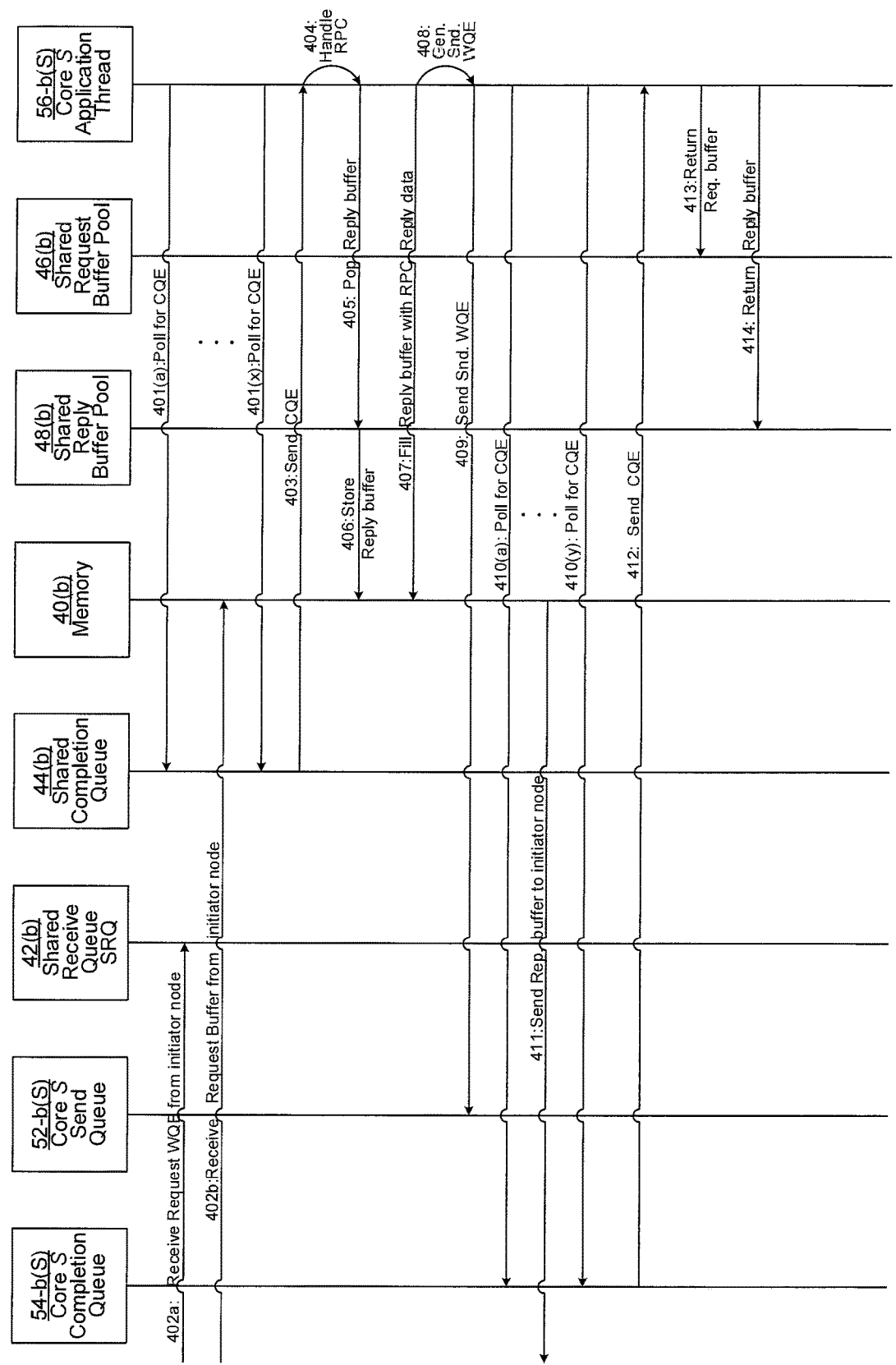

FIG. 3C depicts an example method 400 performed by core #S (i.e., core 35-*b*(S)) of computing device 32(*b*) to receive and handle an RPC request from computing device 32(*a*) with computing device 32(*b*) as target. It should be understood that although methods 200, 400 are depicted as being performed by different cores 35-*b*(R), 35-*b*(S), this is just to indicate that there is no requirement that they be performed by the same core 35-*b* (as would be the case in a symmetric arrangement) —in fact, whether they are performed by the same or different cores 35-*b* is immaterial in an asymmetric arrangement.

When core 35-*b*(S) has free processing cycles, Core S application thread 56-*b*(S) may perform step 401 to poll (e.g., by sending a polling request 80) the Shared CQ 44(*b*) of computing device 32(*b*) for a newly-received request. In some embodiments, although depicted as being performed by Core S application thread 56-*b*(S), step 401 may instead be performed by a dedicated core-specific polling thread (not depicted). In step 402*a*, SRQ 42(*b*) receives the request WQE 75 from the initiator node a, storing it in a Receive WQE 64 that was previously placed into the SRQ 42(*b*) in step 204 of method 200. In step 402*b*, the memory 40(*b*) of target node b receives the contents 76 of the updated request buffer 74 from the initiator node a, storing the contents 76 in the request buffer 62 pointed to by the request WQE 75 (now stored in Receive WQE 64) that was previously allocated (or popped off the shared request buffer pool 46(*b*)) in step 201 of method 200. As depicted, step 401 is performed repeatedly as steps 401(*a*), . . . , 401(*x*), until steps 402*a*, 402*b* occur, allowing the Shared CQ 44(*b*) to respond (step 403) by sending a completion queue element (CQE) 81 back to Core S application thread 56-*b*(S) (or to the core-specific polling thread for core S, which then forwards the CQE 81 to the Core S application thread 56-*b*(S)). CQE 81 points to the Receive WQE 64 that was just received.

It should be understood that the handling of the request encoded by the received contents 76 of the updated request buffer 74 is assigned to core 35-*b*(S) through the polling process of steps 401, 403. It is possible that several cores 35-*b* of node b may be polling the Shared CQ 44(*b*) at substantially the same time, but it is the first core 35-*b* (in this case, core 35-*b*(S)) to issue a polling request 401(*x*) that is received by the Shared CQ 44(*b*) after steps 402*a*, 402*b* have completed that is the one that Shared CQ 44(*b*) sends the CQE 81 to, which is what affects the assignment to core 35-*b*(S).

In response, in step 404, Core S application thread 56-*b*(S) handles the RPC request encoded in the request buffer 62 pointed to by the Receive WQE 64 pointed to by the CQE 81. Then, in step 405, Core S application thread 56-*b*(S) sends a pop command 82 to the shared reply buffer pool 48(*b*) of node b to pop (step 406) a reply buffer 83 from the shared reply buffer pool 48(*b*). Then, in step 407, Core S application thread 56-*b*(S) generates data of an RPC Reply based on the handling of the RPC request from step 404 and stores that data into the reply buffer 83, and in step 408, Core S application thread 56-*b*(S) generates a WQE 84 (depicted as a Send WQE in FIG. 3C) that describes the reply buffer 83 (e.g., it points to the memory address of reply buffer 83 and it includes a send WQE header, which may be 36 bytes in one example embodiment), storing (step 409) the Send WQE 84 in the core-specific send queue 52-*b*(S). At this point, pairing relationship 102-*b*(S) causes the core-specific send queue 52-*b*(S) to be synchronized to SRQ 42(*a*) of computing device 32(*a*) by sending the Send WQE 84 over the network connection 33 using RDMA (see step 502*a* of FIG. 3D). In addition, in step 411, computing device 32(*b*) sends the updated contents 85 of the reply buffer 83 across network connection 33 using RDMA directly into memory 40(*a*) of computing device 32(*a*).

After sending the Send WQE 84 to the core-specific send queue 52-*b*(S) in step 409, Core S application thread 56-*b*(S) (or, in some embodiments, a dedicated core-specific polling thread) performs step 410 to poll the core-specific completion queue 54-*b*(S) for completion of the sending to node a. As depicted, step 410 is performed repeatedly as steps 410(*a*), . . . , 410(*y*), until both the Send WQE 84 and the updated contents 85 of the reply buffer 83 have been successfully sent to node b, allowing the core-specific completion queue 54-*b*(S) to respond (step 412) by sending a CQE back to Core S application thread 56-*b*(S) (or to the core-specific polling thread for core S, which then forwards the CQE to the Core S application thread 56-*b*(S)). In response, Core S application thread 56-*b*(S) returns the request buffer 62 to the shared request buffer pool 46(*b*) (step 413) and the reply buffer 83 to the shared reply buffer pool 48(*b*) (step 414).

Figure 3D:
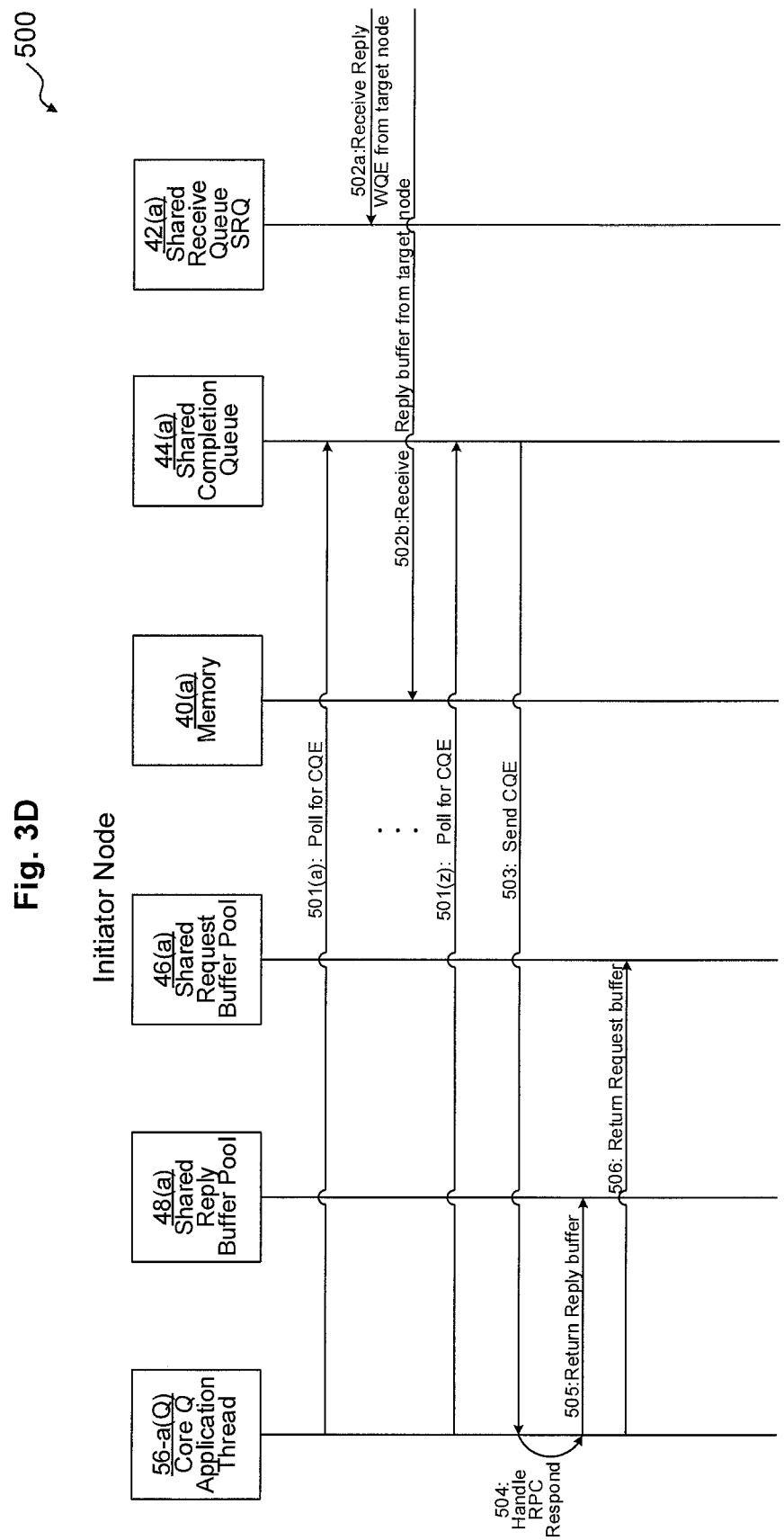

FIG. 3D depicts an example method 500 performed by core #Q (i.e., core 35-*a*(Q)) of computing device 32(*a*) to receive and handle an RPC Reply from computing device 32(*b*). It should be understood that although methods 300, 500 are depicted as being performed by different cores 35-*a*(P), 35-*a*(Q), this is just to indicate that there is no requirement that they be performed by the same core 35-*a* (as would be the case in a symmetric arrangement)—in fact, in some embodiments, whether they are performed by the same or different cores 35-*a* is immaterial.

When core 35-*a*(Q) has free processing cycles, Core Q application thread 56-*a*(Q) may perform step 501 to poll (e.g., by sending a polling request 90) the Shared CQ 44(*a*) of computing device 32(*a*) for a newly-received reply. In some embodiments, although depicted as being performed by Core Q application thread 56-*a*(Q), step 501 may instead be performed by a dedicated core-specific polling thread (not depicted). In step 502*a*, SRQ 42(*a*) receives the reply WQE 84 from the target node b, storing it in a Receive WQE 72 that was previously placed into the SRQ 42(*a*) in step 304 of method 300. In step 502*b*, the memory 40(*a*) of initiator node a receives the contents 85 of the updated reply buffer 83 from the target node b, storing the contents 85 in the reply buffer 71 pointed to by the Receive WQE 72 that was previously allocated (or popped off the shared reply buffer pool 48(*a*)) in step 301 of method 300. As depicted, step 501 is performed repeatedly as steps 501(*a*), . . . , 501(*z*), until steps 502*a*, 502*b* occur, allowing the Shared CQ 44(*a*) to respond (step 503) by sending a CQE 91 back to Core Q application thread 56-*a*(Q) (or to the core-specific polling thread for core Q, which then forwards the CQE 91 to the Core Q application thread 56-*a*(Q)). CQE 91 points to the Receive WQE 72 that was just received.

It should be understood that the handling of the reply encoded by the received contents 85 of the updated request buffer 83 is assigned to core 35-*a*(Q) through the polling process of steps 501, 503. It is possible that several cores 35-*a* of node a may be polling the Shared CQ 44(*a*) at substantially the same time, but it is the first core 35-*a* (in this case, core 35-*a*(Q)) to issue a polling request 501(*z*) that is received by the Shared CQ 44(*a*) after steps 502*a*, 502*b* have completed that is the one that Shared CQ 44(*a*) sends the CQE 91 to, which is what affects the assignment to core 35-*a*(Q).

Upon, receipt of the CQE 91, Core Q application thread 56-*a*(Q) handles the RPC response (step 504) by performing whatever actions are appropriate to perform in response to completion of the RPC request that was originally initiated by Core P application thread 56-*a*(P). In some embodiments, instead of step 504 (and subsequent steps 505, 506) being performed by Core Q application thread 56-*a*(Q), Core Q application thread 56-*a*(Q) signals the original initiating thread (i.e., the Core P application thread 56-*a*(P)) so that that thread 56-*a*(P) is able to handle the RPC response.

Finally, Core Q application thread 56-*a*(Q) (or, in some embodiments, Core P application thread 56-*a*(P)) returns the reply buffer 71 to the shared reply buffer pool 48(*a*) (step 505) and the request buffer 74 to the shared request buffer pool 46(*a*) (step 506).

FIG. 4 illustrates an example method 600 performed by a computing device 32(*b*) for performing a remotely-initiated procedure. It should be understood that any time a piece of software (e.g., OS, threads 56, etc.) is described as performing a method, process, step, or function, what is meant is that a computing device 32 on which that piece of software is running performs the method, process, step, or function when executing that piece of software on its processing circuitry 36. It should be understood that one or more of the steps or sub-steps of method 600 may be omitted in some embodiments. Similarly, in some embodiments, one or more steps or sub-steps may be combined together or performed in a different order.

In step 610, a computing device 32(*b*) allocates, by a first core (e.g., core 35-*b*(R)) of a plurality of cores 35-*b*, a memory buffer (e.g., request buffer 62) in which to store a request to be received from a remote computing device 32(*a*). In some embodiments, step 610 includes sub-step 615 in which the memory buffer 62 is allocated from a shared pool of memory (e.g., shared request buffer pool 46(*b*)) of the computing device 32(*b*), the shared pool being shared by the plurality of cores 35-*b*. In some embodiments, step 610 may include all or some of steps 201-204 from method 200.

In step 620, memory 40(*b*) of the computing device 32(*b*) receives a request (e.g., contents 76 of the request buffer 74, stored in the memory buffer 62 allocated in step 610) from a remote computing device 32(*a*) via RDMA. In some embodiments, step 620 includes sub-step 622. In sub-step 622, SRQ 42(*b*) of the computing device 32(*b*) also receives a request descriptor (e.g., Send WQE 75) that describes the request, the SRQ 42(*b*) being shared between the plurality of cores 35-*b*. In some embodiments, step 622 includes sub-step 624. In sub-step 624, the request descriptor 75 is received from a remote core-specific send queue 52-*a*(P) of the remote computing device 32(*a*), the remote computing device 32(*a*) including a plurality of core-specific send queues 52-*a* that are each paired to a respective remote core 35-*a* of the remote computing device 32(*a*), each remote core-specific send queue 52-*a* being configured to synchronize with the SRQ 42(b), the remote core-specific send queue 52-a(P) corresponding to a remote core 35-a(P) having a different local core number (#P) than a local core number (#5) of the core from step 630. In some embodiments, step 620 may include one or both of steps 402a, 402b from method 400.

In step 630, computing device 32(b) assigns processing of the request to one core (i.e., core 35-b(S) having local core #S, different than the first core 32-b(R) from step 610, local core #S being different than the local core #P of the remote core 35-a(P)) of a plurality of cores 35-b of the computing device 32(b). In some embodiments, step 630 includes sub-step 632 and/or sub-step 634. In sub-step 632, a thread (e.g., Core S Application Thread 56-b(S) or a different core-specific polling thread) running on core 35-b(S) polls Shared CQ 42(b) of the computing device 32(b) for a completion signal (e.g., CQE 81, the Shared CQ 42(b) being shared between the plurality of cores 35-b, core 35-b(S) being the first core of the plurality of cores 35-b to poll the Shared CQ 42(b) after receiving the request of step 620, each of the plurality of cores 35-b being configured to poll the Shared CQ 42(b) when that core 35-b has available processing cycles. In sub-step 634, the thread (e.g., Core S Application Thread 56-b(S) or a different core-specific polling thread) running on core 35-b(S) receives the completion signal (e.g., CQE 81) from the Shared CQ 42(b), thereby effecting the assignment. In some embodiments, step 630 may include all or some of steps 401, 403 from method 400.

In step 640, Core S Application Thread 56-b(S) running on core S performs a procedure described by the request of step 620. In some embodiments, step 640 may include step 404 from method 400.

In step 650, computing device 32(b) (e.g., Core S Application Thread 56-b(S)) sends a reply (e.g., reply WQE 84 and reply buffer 83 with contents 85) to the remote computing device 32(a) using a core-specific send queue, each of the plurality of cores having a respective core-specific send queue 52-b(S). In some embodiments, step 650 may include all or some of steps 405-414 from method 400.

Thus, techniques have been presented techniques for implementing an asymmetric arrangement for RPCs between multi-core devices 32(a), 32(b) using RDMA. This may be accomplished by configuring multiple per-core send queues 52-a on an initiator device 32(a) to all pair to a single shared receive queue 42(b) that is shared between multiple cores 35-b on a target device 32(b). The shared receive queue 42(b) is associated with a single Shared CQ 44(b) of the target device 32(b), the Shared CQ 44(b) being configured to report completed receipt of commands by the associated shared receive queue 42(b). Upon receipt (step 620), by the target device 32(b), of a command from the initiator device 32(a), the target device 32(b) assigns (step 630) that command to a particular core 35-b(S) of the target device 32(b). This assignment may be done by having cores 35-b of the target device 32(b) poll the Shared CQ 44(b) when they have free cycles (sub-step 632), and assigning the command to the first core 35-b(S) to poll the Shared CQ 44(b). In some embodiments, the per-core send queues 52 share one or more pools of buffers (e.g., shared request buffer pool 46, shared reply buffer pool 48).

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of performing a remotely-initiated procedure on a computing device, the method comprising:

receiving, by memory of the computing device, a request from a remote device via remote direct memory access (RDMA), wherein receiving the request includes receiving, from a remote core specific send queue of the remote device, a request descriptor that describes the request at a shared receive queue (SRQ) of the computing device, the SRQ being shared between a plurality of processing cores of the computing device, and wherein the remote core specific send queue is one of a plurality of core-specific send queues in the remote device that are each paired to a respective remote processing core of the remote device, each remote core specific send queue being configured to synchronize with the SRQ, the remote core specific send queue corresponding to a remote processing core of the remote device having a different local core number than a local core number of one processing core of the plurality of processing cores of the computing device;

in response to receiving the request, assigning processing of the request to the one processing core of the plurality of processing cores of the computing device, wherein assigning includes the one processing core receiving a completion signal from the shared completion queue (Shared CQ) of the computing device, the Shared CQ being shared between the plurality of processing cores of the computing device, wherein the completion signal from the Shared CQ reports completed receipt of a request descriptor that describes the request, wherein the assigning further includes, prior to the one processing core receiving the completion signal from the Shared CQ, polling the Shared CQ by the one processing core for a completion signal, the one processing core being the first processing core of the plurality of processing cores to poll the Shared CQ after receipt of the request, each of the plurality of processing cores being configured to poll the Shared CQ when that processing core has available processing cycles;

in response to assigning, performing, by the one processing core, a procedure described by the request; and sending a reply to the remote device using a core-specific send queue, each of the plurality of processing cores having a respective core-specific send queue.

2. A method of performing a remotely-initiated procedure on a computing device, the method comprising:

allocating, by a first processing core of a plurality of processing cores of the computing device, a memory buffer in which to store a request from a remote device;

receiving, by memory of the computing device, the request from the remote device via remote direct memory access (RDMA), wherein receiving the request includes receiving, from a remote core specific send queue of the remote device, a request descriptor that describes the request at a shared receive queue (SRQ) of the computing device, the SRQ being shared between a plurality of processing cores of the computing device, and wherein the remote core specific send queue is one of a plurality of core-specific send queues in the remote device that are each paired to a respective remote processing core of the remote device, each remote core specific send queue being configured to synchronize with the SRQ, the remote core specific send queue corresponding to a remote processing core of the remote device having a different local core number than a local core number of a second processing core of the plurality of processing cores of the computing device different from the first processing core;

in response to receiving the request, assigning processing of the request to the second processing core of the plurality of processing cores of the computing device, wherein assigning includes the second core receiving a completion signal from a shared completion queue (Shared CQ) of the computing device, the Shared CQ being shared between the plurality of processing cores of the computing device, wherein the completion signal from the Shared CQ reports completed receipt of a request descriptor that describes the request, wherein the assigning further includes, prior to the second processing core receiving the completion signal from the Shared CQ, polling the Shared CQ by the second processing core for a completion signal, the second processing core being the first processing core of the plurality of processing cores to poll the Shared CQ after receipt of the request, each of the plurality of processing cores being configured to poll the Shared CQ when that processing core has available processing cycles; and in response to assigning, performing, by the second processing core, a procedure described by the request.

3. The method of claim 2 wherein allocating the memory buffer in which to store the request includes allocating the memory buffer from a shared pool of memory of the computing device, the shared pool of memory being shared by the plurality of processing cores.

4. A system for performing a remotely-initiated procedure, the system comprising:

a first computing device, the first computing device including a first plurality of processing cores;

a network connection; and a second computing device, the second computing device including a second plurality of processing cores, the second computing device being communicatively coupled to the first computing device via the network connection, the second computing device being configured to:

receive, by memory of the second computing device, a request from the first computing device via remote direct memory access (RDMA) over the network connection, wherein receipt of the request includes receipt, from a remote core specific send queue of the first computing device, a request descriptor that describes the request at a shared receive queue (SRQ) of the second computing device, the SRQ being shared between the second plurality of processing cores of the second computing device, and wherein the remote core specific send queue is one of a plurality of core-specific send queues in the first computing device that are each paired to a respective remote processing core of the first computing device, each remote core specific send queue being configured to synchronize with the SRQ, the remote core specific send queue corresponding to a remote processing core of the first computing device having a different local core number than a local core number of one processing core of the second plurality of processing cores of the second computing device;

in response to receiving the request, assign processing of the request to the one processing core of the second plurality of processing cores of the second computing device, wherein assigning includes the one processing core receiving a completion signal from a shared completion queue (Shared CQ) of the second computing device, the Shared CQ being shared between the second plurality of processing cores of the second computing device, wherein the completion signal from the Shared CQ reports completed receipt of a request descriptor that describes the request, wherein the assigning further includes, prior to the one processing core receiving the completion signal from the Shared CQ, polling the Shared CQ by the one processing core for a completion signal, the one processing core being the first processing core of the second plurality of processing cores to poll the Shared CQ after receipt of receiving the request, each of the second plurality of processing cores being configured to poll the Shared CQ when that processing core has available processing cycles; and in response to assigning, perform, by the one processing core, a procedure described by the request.

5. The system of claim 4 wherein the second computing device is further configured to send a reply to the first computing device using a core-specific send queue, each of the second plurality of processing cores having a respective core-specific send queue.

6. The system of claim 4 wherein the second computing device is further configured to, prior to receiving the request, allocate, by a different processing core of the second plurality of cores, a memory buffer in which to store the request.

7. The system of claim 6 wherein allocating the memory buffer in which to store the request includes allocating the memory buffer from a shared pool of memory of the second computing device, the shared pool of memory being shared by the second plurality of processing cores.

8. The system of claim 4 wherein the first computing device is configured to:
  prior to sending the request to the second computing device, allocating, by a processing core of the first plurality of processing cores, from a shared pool of memory of the first computing device, a memory buffer in which to store a reply from the second computing device, the shared pool of memory being shared by the first plurality of processing cores; and
in response to the second computing device performing the procedure described by the request, receiving the reply from the second computing device via RDMA over the network connection and storing the reply in the allocated memory buffer.

9. The system of claim 8 wherein the first computing device is further configured to:
  in response to the first computing device receiving the reply from the second computing device, assign processing the reply to another processing core of the first plurality of processing cores; and
  process the reply by the other processing core of the first plurality of processing cores.

10. The system of claim 8 wherein the first computing device is further configured to: at the other processing core of the first plurality of processing cores that the reply was in response to the request initiated by the processing core of the plurality of cores;
  in response to determining, reassign processing the reply to the
  processing core of the first plurality of cores; and
  process the reply by the processing core of the first plurality of cores.

11. A computer program product comprising a non-transitory computer-readable storage medium storing instructions, which, when executed by processing circuitry of a computing device, cause the computing device to perform a remotely-initiated procedure by:
  receiving, by memory of the computing device, a request from a remote device via remote direct memory access (RDMA), including receiving at a shared receive queue (SRQ) of the computing device, a request descriptor that describes the request, the SRQ being shared between a plurality of processing cores of the processing circuitry, wherein receiving the request descriptor includes receiving the request descriptor from a remote core-specific send queue of the remote device, the remote device including a plurality of core-specific send queues that are each paired to a respective remote processing core of the remote device, each remote core-specific send queue being configured to synchronize with the SRQ, the remote core specific send queue corresponding to a remote processing core of the remote device having a different local core number than a local core number of one processing core of the plurality of processing cores of the computing device;
  in response to receiving the request, assigning processing of the request to the one processing core of the plurality of processing cores, wherein assigning includes the one processing core receiving a completion signal from a shared completion queue (Shared CQ) of the computing device, the Shared CQ being shared between the plurality of processing cores of the computing device, wherein the completion signal from the Shared CQ reports completed receipt of the request descriptor that describes the request, wherein the assigning further includes, prior to the one processing core receiving the completion signal from the Shared CQ, polling the Shared CQ by the one processing core for a completion signal, the one processing core being the first processing core of the plurality of processing cores to poll the Shared CQ after receipt of the request, each of the plurality of processing cores being configured to poll the Shared CQ when that processing core has available processing cycles; and
  in response to assigning, performing, by the one processing core, a procedure described by the request.

12. The method of claim 11, wherein the completion signal from the Shared CQ reports completed receipt of the request descriptor by the associated SRQ;
  wherein the request descriptor points to a memory address within the memory of the computing device of a request buffer allocated from a shared request buffer pool that is shared by the plurality of processing cores and that is associated with the Shared CQ and the SRQ; and
  wherein the request buffer stores the request.

* * * * *